(12) United States Patent
Kawasaki et al.

(10) Patent No.: US 6,582,832 B2
(45) Date of Patent: Jun. 24, 2003

(54) HOLLOW-SHAPED MATERIAL

(75) Inventors: Takeshi Kawasaki, Kudamatsu (JP); Sumio Okuno, Kudamatsu (JP); Toshiaki Makino, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 67 days.

(21) Appl. No.: 09/791,809

(22) Filed: Feb. 26, 2001

(65) Prior Publication Data

US 2001/0006710 A1 Jul. 5, 2001

(51) Int. Cl.[7] .................. B21C 27/00; B21D 28/00; B21F 27/00; B22F 5/00; B32B 3/00

(52) U.S. Cl. .................. 428/599; 428/600; 428/34.1

(58) Field of Search .................. 428/598, 599, 428/654, 582, 593, 595, 34.1, 600

(56) References Cited

U.S. PATENT DOCUMENTS

| 6,193,137 | B1 | * | 2/2001 | Ezumi et al. | 228/112.1 |
| 6,250,037 | B1 | * | 6/2001 | Ezumi et al. | 53/592.1 |
| 6,321,975 | B1 | * | 11/2001 | Kawasaki et al. | 228/112 |

* cited by examiner

*Primary Examiner*—Harold Pyon
*Assistant Examiner*—Michael C. Miggins
(74) *Attorney, Agent, or Firm*—Antonelli, Terry, Stout & Kraus, LLP

(57) ABSTRACT

The present invention aims to provide a joint figuration inhibiting decrease in strength resulting from welding at the joint region, in a case where hollow-shaped material is friction stir welded. A face plate 101 (111) between a rib 105 (115) at the end portion of a hollow-shaped material 100 (110) and a rib 103 (113) has a thickness t2 (t5) at the rib 105 (115) side and ti at the rib 103 (113) side. The thickness t2 (t5) is thicker than ti. The thickness between the two is changed smoothly. The thickness of the plate thickness t2 (t5) is provided by projecting towards the other face plate side.

2 Claims, 4 Drawing Sheets

```
100, 110:      hollow-shaped material
101, 102:      face plate
103, 105, 113, 115: rib
107, 117:      projection
```

100, 110:       hollow-shaped material
101, 102:       face plate
103, 105, 113, 115: rib
107, 117:       projection

HOLLOW-SHAPED MATERIAL

FIELD OF THE INVENTION

The present invention relates to a joint figuration of a hollow-shaped material to be used in friction stir welding. For example, the present invention relates to a hollow-shaped material made of aluminum alloy used in railway cars or structures and the like.

DESCRIPTION OF THE RELATED ART

A friction stir welding method is a technique using a round shaft (called a rotary tool) being inserted into the welding region of members and moving the rotating rotary tool along the welding line, thereby heating, mobilizing, fluidizing and plasticising the welding region, and realizing a solid-phase welding of the members. The rotary tool comprises a small-diameter portion to be inserted to the welding region, and a large-diameter portion positioned at outer side thereof. The small-diameter portion and the large-diameter portion are coaxial. The boundary between the small-diameter portion and the large-diameter portion is slightly inserted into the welding region. The rotary tool is inclined rearwards against the progressing direction of the welding.

When the materials to be welded are hollow-shaped materials, the joint at the end portion thereof is constituted so that one end portion of one of the hollow-shaped material includes a rib for connecting the two face plates, and the face plates at the end portion of the other hollow-shaped material are superimposed on the above-mentioned rib. Also, centering on the above-mentioned rib, there are provided a convex portion projecting outwardly to each of the face plates. This region is friction stir welded.

This technique is disclosed in Japanese Patent National Publication of PCT Applications No. 09-508073 (EP 0752926B1), and Japanese Patent Laid-Open No. 09-309164 (EP 0797043A2).

SUMMARY OF THE INVENTION

When welding hollow-shaped materials together in order to obtain a structural body, the constitution of the joint is complex in figuration, unlike other members. Therefore, it is necessary to prevent the joint from decreasing in strength.

In order to prevent decrease in strength as a result of welding, a method of thickening the plate thickness of the joint compared to other members, regardless of the welding method, is known in the art. However, in order to reduce weight, the plate thicknesses of the general members areas thin as possible. Under such constitution, there exists large difference in rigidity between the general members constituting the structural body and the joint. The difference in rigidity between adjacent members results in occurrence of stress concentration, and occurrence of outward bending deformation by the bending moment. Therefore, a complicated stress field is formed, so that the strength of the region is decreased.

Also, when performing the friction stir welding method, the rotary tool is inserted into the hollow-shaped material, so that a large load acts on the direction of insertion. Such load is borne by ribs connecting the two face plates. Moreover, a force acts not only in the direction of insertion but also in the radius direction. Therefore, the above-mentioned rib is formed for the object of bearing the load generated in connection with insertion of the tool, and the plate thickness of the rib is increased. Moreover, the shape of the welding region becomes complicated. When the figuration of the joint becomes complex in order to increase strength, the difference in rigidity between the general members constituting the hollow-shaped material and the welding region becomes even larger. These result in increase in outward bending moment, and decrease in mechanical strength of the joint. As is seen from above, there exists inconsistency that when a joint is constituted so as to successfully obtain strength capable of bearing load generated during welding, the mechanical strength of the joint practically required is decreased owing to the difference in rigidity.

Moreover, when a tension or an outward bending deformation occurs to the hollow-shaped extrusion material of the structural body, such load is mainly borne by the face plate. That is, the cross-section at the intersection of the face plate and the above-mentioned rib is changed suddenly resulting in concentration of the stress, so that a high stress compared to other general members is generated. Therefore, a high stress compared to those generated in the general regions of the face plates is generated at the intersection of the face plate and the rib, causing decrease in strength.

Moreover, regardless of the welding method such as a friction stir welding or a MIG welding and the like, it is known in the art that the strength becomes the weakest at the heat-affected zone resulting from welding. Even in the case of friction stir welding having narrower heat-affected zone than MIG welding, a report is made in an outline of the lectures in national convention of the Welding Society (1998/10), in pages 332 through 333, that the width of the heat-affected zone is approximately 13 mm from the center of the tool. According to the present report, approximately the entire joint having complex figuration becomes the heat-affected zone.

As seen from above, the joint of the friction stir welding is remarkably decreased in strength, resulting from synergic effect of (1) bending moment inducted from the difference in rigidity (plate thickness), (2) stress concentration owing to complex figuration peculiar to the joint, (3) thermal effect as a result of welding, and (4) stress concentration resulting from connecting the rib with the face plate.

The present invention aims at providing a joint structure, which does not decrease in strength during friction stir welding.

The present invention relates to a hollow-shaped material, comprising:

two substantially parallel face plates;

a pair of first ribs for connecting said face plates together at each end portion of the face plates; and a plurality of second ribs for connecting the face plates at positions closer to the opposite end portion than each of first ribs; wherein the plate thickness of the face plates at connecting regions between the first ribs and the face plates are thicker than the plate thickness of connecting regions between the second ribs and the face plates; and the thickened face plates are thickened by projecting toward the opposing face plate side.

BRIEF DESCRIPTION OF THE DRAWINGS

In FIGS. 1, 2, 4, 5, 6 and 7, each of the pair of hollow-shaped materials, or a portion thereof, are designated by the reference numerals 100 and 110, respectively. Reference numerals 101 through 109 refer to structural features of hollow shaped material 100, and reference numerals 111 to 119 refer to structural features of hollow shaped material 110.

DETAILED DESCRIPTION OF PREFERRED EMBODIMENTS

Figure 1:
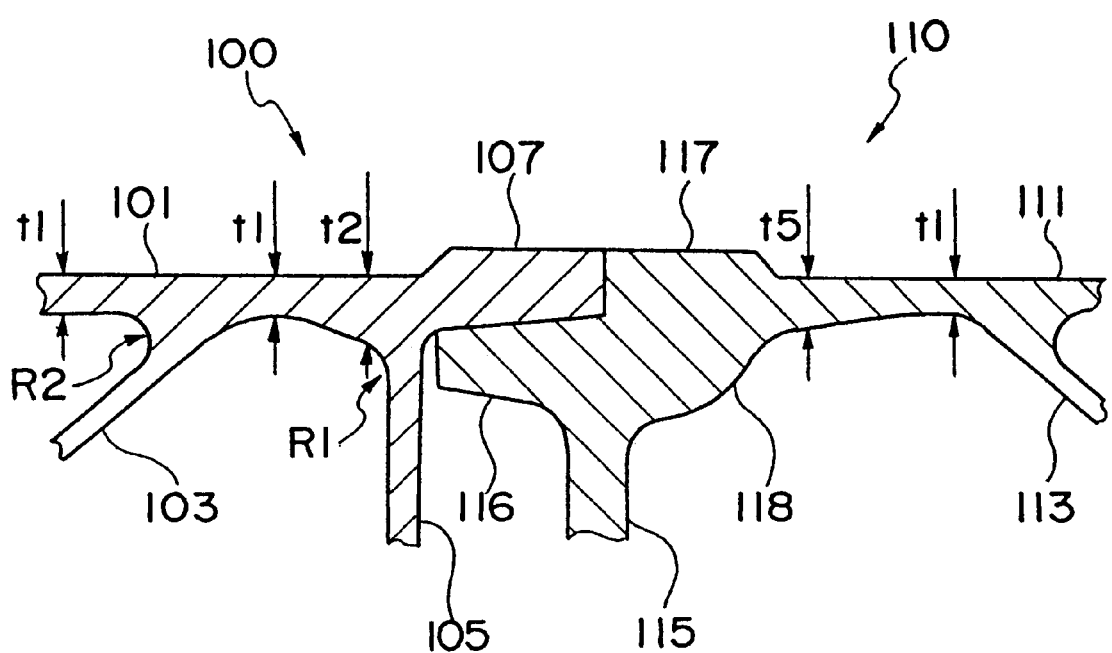
FIG. 1 is a longitudinal cross-sectional view of a pair of hollow-shaped materials according to one embodiment of the present invention.

A preferred embodiment of the present invention will now be explained with reference to FIG. 1 through FIG. 3. In FIG. 3, a railway car structure 200 is comprised of end structures 201 forming a surface closing the either end in the longitudinal direction of the car body, side structures 202 forming left and right surfaces to the longitudinal direction of the car body, a roof structure 203 forming the roof, and an underframe 204 constituting the floor. There are provided openings for windows and entrances to the side structures 202. All or a part of the railway car structure 200 is constituted by welding hollow-shaped extruded materials made of aluminum alloy (hereinafter referred to as hollow-shaped materials) 100, 110 together. A case where hollow-shaped materials 100, 110 are arranged for the side structure 202 and the roof structure 203 is shown. The extruded direction (longitudinal direction) of the hollow-shaped materials 100, 110 is arranged in the longitudinal direction of the car body.

Figure 2:
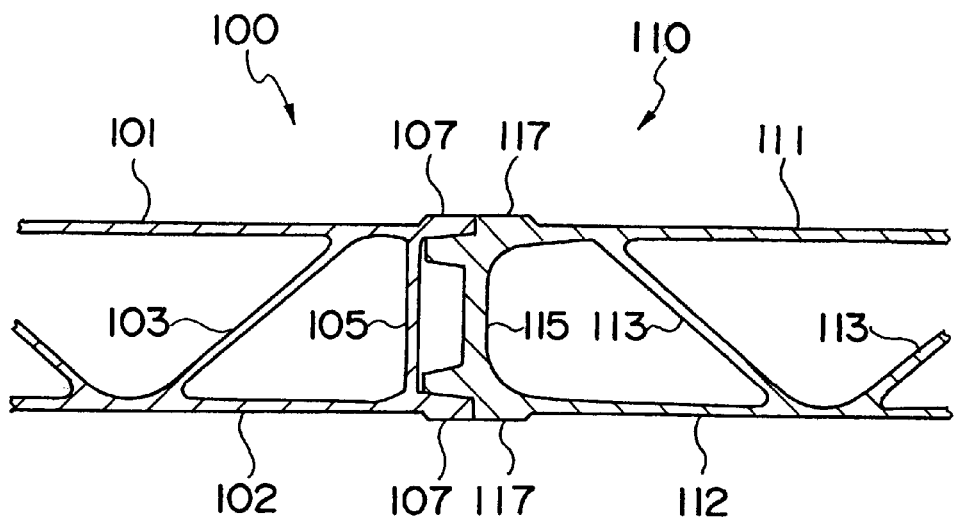
FIG. 2 is an enlarged cross-sectional view of a joint at the upper surface side of FIG. 1.
Figure 3:
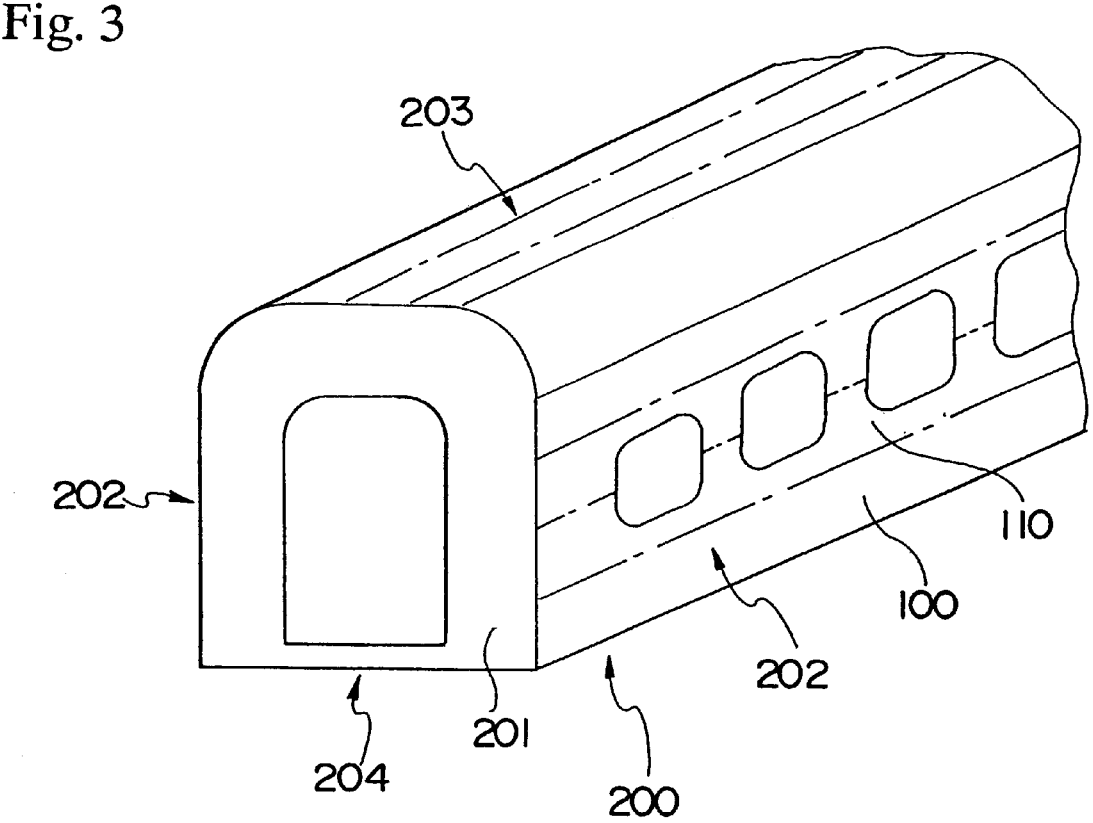
FIG. 3 is a perspective view of a railway car structure applied with the present invention.

The periphery of a joint of the hollow-shaped materials 100, 110 to be welded is shown in FIG. 2. The hollow-shaped material 100 (110) is comprised of two parallel face plates 101, 102 (111, 112), a plurality of ribs 103 (113) for connecting the face plates, which are inclined against the face plates, and ribs 105 (115) for connecting the two face plates 101, 102 (111, 112) at each of the end portions of the hollow-shaped material 100 (110), which are perpendicular to the face plates. The ribs 103 (113) are arranged in a truss-like pattern. There exist face plates 101, 102 (111, 112) between the rib 105 (115) and the rib 103 (113) adjacent thereto. The two face plates may be formed so that one face plate is inclined against the other face plate.

The explanation will be given for the joint with reference to FIG. 1. The upper joint of the hollow-shaped material 100, 110 in FIG. 2 will be explained herein. However, the same applies to the joint in the lower surface. The constitution of the upper surface and that of the lower surface are the also same for the joint figuration in the succeeding embodiments explained afterwards.

The face plate 101 of the hollow-shaped material 100 is projected more towards the end portion side than the rib 105. The end portion of the face plate 101 is positioned within the range of the plate thickness of the rib 115. In order to receive the face plate 101, the end portion of the hollow-shaped material 110 on the face plate 111 side is concaved.

The end portion of the hollow-shaped material 110 includes a projecting segment 116 projecting more towards the end portion side than the rib 115. The projecting segment 116 is positioned to the rear side of the end portion of the face plate 101, and operates as a backing.

The outer surface side of the end portion of the face plate 101 (111) of the hollow-shaped material 100 (110) is projected to form a projection 107 (117).

The face of the end portion of the projection 107 (117) of the face plate 101 (111) is perpendicular to the face plate. The face of the aforementioned concave portion on the face plate 111 side (the side abutted against the end portion of the face plate 101) is perpendicular to the face plate 111. The face of the aforementioned concave portion on the face plate 111 side is positioned within the range of the plate thickness of the rib 115.

The connecting regions between the ribs 103, 105 (113, 115) and the face plate 101 (111) or the like are arcuate. The connecting region between the rib 115 and the face plate 111 includes a projection 118 projecting arcuately towards the hollow portion side. The radius R1 of the arc of the connecting region between the rib 105 and the face plate 101 is larger than the radius R2 of the arc of the connecting region between the rib 103 and the face plate 101 on the acute angle side.

The plate thickness t2 of the face plate 101 at the connecting region between the rib 105 and the face plate 101 is larger than the plate thickness t1 of the face plate at the connecting region between the rib 103 and the face plate 101 or the plate thickness t1 of the face plate 101 at the general region. The outer surface of the face plate 101 is flat other than the projection 107. The plate thickness t2 is thickened by being projected towards the hollow-portion side (the side facing the opposing face plate 102). The face plate 101 between the rib 103 and the rib 105 is changed smoothly. The distance between the plate thickness t2 and the plate thickness t1 is determined in view of the heat affection of the friction stir welding.

The plate thickness t5 of the face plate 111 at the projection 117 side is larger than the plate thickness t1 of the face plate at the connecting region between the rib 113 and the face plate 111 or the plate thickness t1 of the face plate 111 at the general region. The outer surface of the face plate 111 is flat except for the projection 117. The plate thickness t5 is thickened by being projected towards the hollow-portion side. The distance between the plate thickness t5 and the plate thickness t1 of the face plate 111 is determined in view of the heat affection of the friction stir welding. The plate thickness of the face plate 111 is changed smoothly from t5 to t1.

The distance of the face plate 102 between the plate thickness t2 (t5) and the plate thickness t1 on the face plate 102 (112) side is the same as the distance of the face plate 101 between the plate thickness t2 (t5) and the plate thickness t1 on the face plates 101 (111) side.

The center of the rotary tool for use in friction stir welding is positioned on the elongation of the plate thickness of the rib 115. Therefore, the rib 115 bears a large proportion of the inserting force of the rotary tool.

In the figures, no gaps exist in the butted region between the two hollow-shaped materials 100, 110 (butted region between the end portion of the hollow-shaped material 100 and the end portion of the hollow-shaped material 110). However, gaps are formed in many cases.

The rotary tool is comprised of a large-diameter portion and a small-diameter portion to the leading end thereof. The friction stir welding is performed by positioning a part of the boundary of the small-diameter portion and the large-diameter portion between the outer surfaces of the face plates 101, 111 and the outer surface of the projection. The leading end of the small-diameter portion reaches the upper surface of the projecting segment 116. The diameter of the large-diameter portion is smaller than the sum width of the two projections 107, 117. After friction stir welding, the two projections 107, 117 are cut out, if necessary. As a result, the outer surface of the structural body becomes flat.

With such structure, it is possible to increase the section modulus at the face plate in the vicinity of the joint where the outward bending moment is maximized. The relation of the section modulus, outward bending moment and the generated stress could be expressed by the following formula.

$$.=M/Z \qquad (1)$$

.: generated stress
M: outward bending moment
Z: section modulus

Also, the section modulus Z to a unit width could be expressed by the following formula.

$$Z=h*h/6 \qquad (2)$$

Z: section modulus
h: plate thickness

In formula (2), the outward bending moment M as a numerator is fixed, whereas the section modulus Z as a denominator increases in proportional to the plate thickness square by increasing the plate thickness. Therefore, the generation of stress resulting from outward bending moment could be reduced. Moreover, the outward bending moment is the largest at the welding region between the joint and the face plate, and is decreased as it distances away therefrom. Therefore, weight reduction could be achieved by greatly increasing the plate thickness at region where the outward bending moment is large, in order to greatly reduce the stress, and slightly increasing the plate thickness at region where the outward bending moment is small, in order to slightly reduce the stress. Furthermore, by increasing the plate thickness at the inner side of the face plate, the rigidity between the face plate and the joint could be changed smoothly. Therefore, the stress concentration resulting from the joint figuration or the existence of the rib could be reduced. Still further, outer surfaces being flat in appearance could be obtained, so that good exteriority could be obtained.

Also, the radius R1 of the arc between the rib 105 and the face plate 101 is larger than the radius R2 of the arc at the connecting region between the rib 103 and the face plate 101. Therefore, the stress concentration is reduced at the region where strength is decreased by the thermal affect resulting from friction stir welding, so that strength could be improved.

Figure 4:
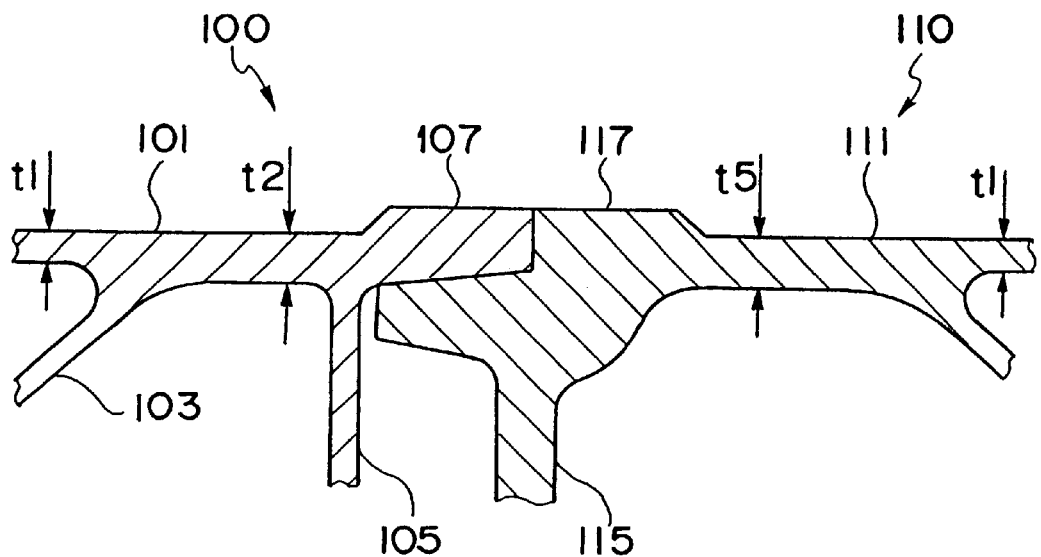
FIG. 4 is an enlarged cross-sectional view of a joint at the upper surface side of another embodiment of the present invention.

The embodiment shown in FIG. 4 will be explained. Every plate thickness of the face plates 101, 111 at the vicinity of the joint (vicinity of the ribs 105, 115) is set at t2, t5. The distance of the face plate with the plate thickness t2 (t5) at the face plate 102 (112) side is the same as the distance from the rib 105 (115) to the rib 103 (113) at the face plate 101 (111) side.

The figuration at the vicinity of the joint is complex, so that it is difficult to determine the stress distribution or the deformation mode. However, with the present embodiment, strength could be improved regardless of the stress distribution or the deformation mode.

Figure 5:
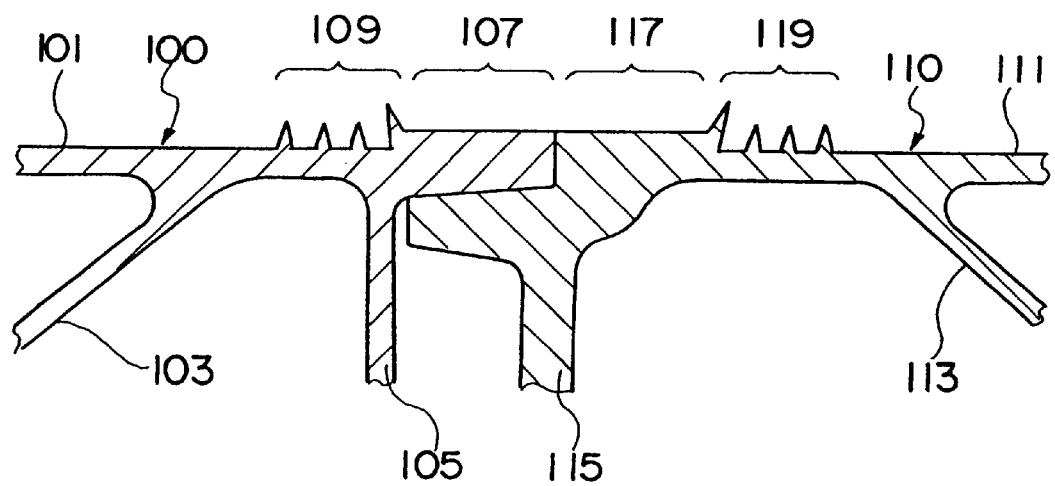
FIG. 5 is an enlarged cross-sectional view of a joint at the upper surface side of another embodiment of the present invention.

The embodiment shown in FIG. 5 will be explained. A plurality of fins 109, 119 are formed integrally to the outer surface side of the face plates 101, 111 at the vicinity of the joint.

With such configuration, the heat generated during welding is released from fins 109, 119, so that the region where the strength is decreased from the thermal effect could be narrowed, resulting in improved strength.

Figure 6:
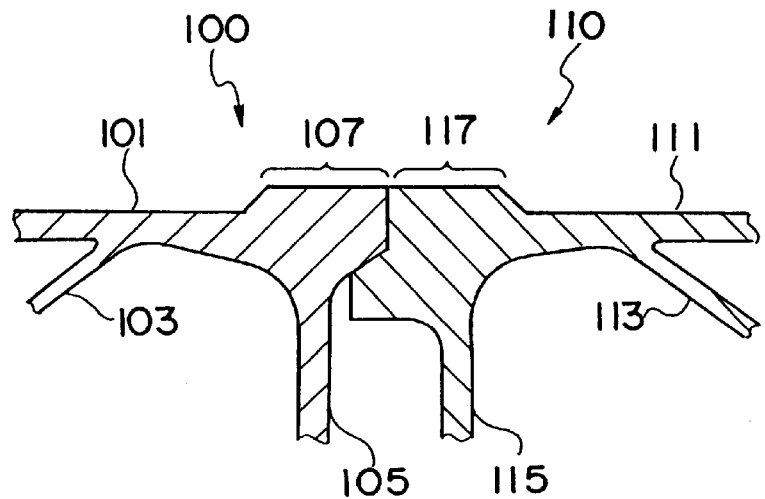
FIG. 6 is an enlarged cross-sectional view of a joint at the upper surface side of another embodiment of the present invention.

The embodiment shown in FIG. 6 will be explained. The ribs 105, 115 are positioned in identical distance from the end portions of the butted face plates 101, 111 (end surfaces of the projections). The distance from the rib 105 to the rib 115 (not the distance between the center of plate thicknesses of the ribs 105, 115, but the distance between the surfaces of the ribs 105, 115 facing the hollow-portion) is smaller than the diameter of the large-diameter portion of the rotary tool. With such constitution, the inserting force of the rotary tool is borne by the two ribs 105, 115. The plate thicknesses t2, t5 of the face plates, or the radius R2 of the arc are the same as in the above-described embodiments.

Figure 7:
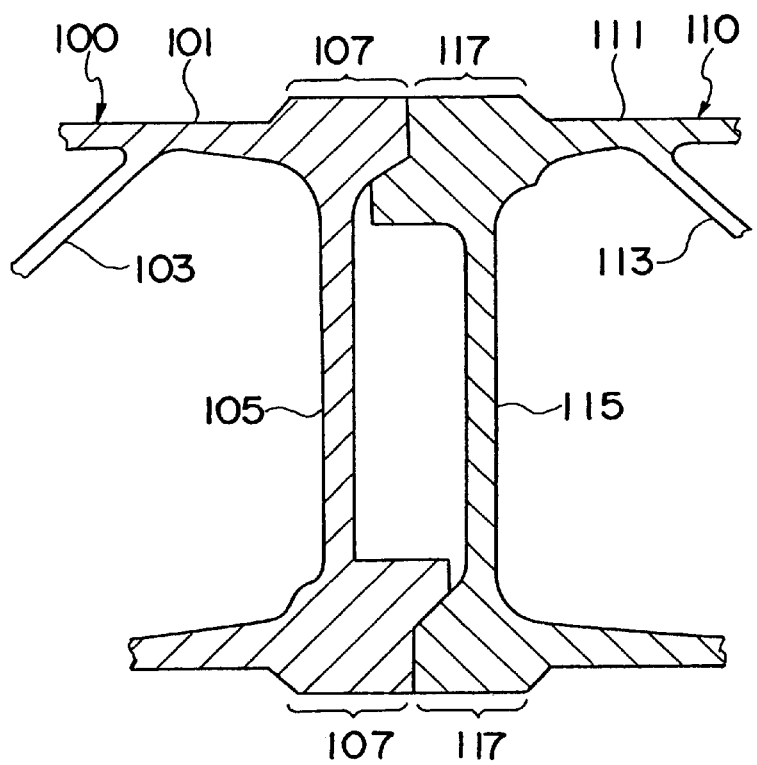
FIG. 7 is an enlarged cross-sectional view of a joint at the upper surface side of another embodiment of the present invention.

The embodiment shown in FIG. 7 has a configuration of the end portion of the hollow-shaped material reversed at upper surface side and the lower surface side. The plate thicknesses t2, t5 of the face plate, or the radius R2 of the arc are the same as in the above-described embodiments.

The technical scope of the present invention is not limited to the terms used in the claims or in the summary of the present invention, but is extended to the range in which a person skilled in the art could easily substitute based on the present disclosure.

The present invention provides good welding, in a case where friction stir welding method is applied to welding of the members.

We claim:

1. A hollow-shaped material comprising:

two substantially parallel face plates; both face plates comprising
   a first rib and
   a second rib connecting said face plates together at positions closer to the opposite end portion than said first rib;
   wherein the plate thickness of said face plates at connecting regions between said first rib and said face plates is thicker than the plate thickness of said face plates at connecting regions between said second rib and said face plates;
   wherein said thickened face plates are thickened by projecting toward the opposing face plate side; and
   wherein the plate thickness of said face plates between said first rib and said second rib adjacent thereto are decreased toward said second rib side.

2. A structural body comprising:

two hollow-shaped materials being welded together, each of said hollow-shaped material comprising two substantially parallel face plates, both face plates comprising a first rib and a second rib connecting said face plates together at positions closer to the opposite end portion than each of said first rib;
   wherein the plate thickness of said face plates at connecting regions between said first rib and said face plates are thicker than the plate thickness of said face plates at connecting regions between said second rib and said face plates;

wherein said thickened face plates are thickened by projecting toward the opposite face plate side, wherein the plate thickness of said face plates between said first rib and said second rib adjacent thereto are decreased toward said second rib side.

* * * * *